US 6,697,637 B1

(12) United States Patent
Willey

(10) Patent No.: US 6,697,637 B1
(45) Date of Patent: Feb. 24, 2004

(54) METHOD FOR ESN REBINDING WHEN A TMSI IS ASSIGNED

(75) Inventor: William Daniel Willey, San Francisco, CA (US)

(73) Assignee: Motorola Inc., Schaumburg, IL (US)

( * ) Notice: Subject to any disclaimer, the term of this patent is extended or adjusted under 35 U.S.C. 154(b) by 494 days.

(21) Appl. No.: 09/667,028

(22) Filed: Sep. 21, 2000

(51) Int. Cl.$^7$ ................................................ H04M 1/00
(52) U.S. Cl. ..................... 455/551; 455/410; 455/435.1
(58) Field of Search ........................... 455/432.1, 435.1, 455/550.1, 558, 551, 410, 411

(56) References Cited

U.S. PATENT DOCUMENTS 6,493,553 B1 * 12/2002 Rollender ................... 455/435

* cited by examiner

*Primary Examiner*—Quochien B. Vuong
(74) *Attorney, Agent, or Firm*—David S. Noskowicz; Hisashi D. Watanab

(57) ABSTRACT

In a wireless communication device in which a removable user identity module (R-UIM) (310) having a temporary mobile station identity (TMSI) (330) assigned thereto is moved from a mobile equipment (ME) having an electronic serial number ($ESN_1$) (320) to a different ME (305) having a different $ESN_2$ (315), a method for ESN rebinding is provided. The method includes determining a change in insertion status for the R-UIM (400). Once the R-UIM is inserted into a different ME having a different ESN, a registration is initiated (410) using an address type which is different than the TMSI address type assigned to the R-UIM. Preferably, a registration is initiated by transmitting a Registration Message (350) containing an international mobile station identity (IMSI) (370) associated with the R-UIM and the different $ESN_2$ (315) associated with the different ME (305) to a base station (390). If the registration is determined to be successful (415), the assigned TMSI (330) is then bound to the new $ESN_2$ (315). Conversely, if the registration is determined to be unsuccessful (415), the existing TMSI is deleted (420) from the R-UIM memory (325). The present method keeps the infrastructure, i.e. the base stations, informed as to a new ESN associated with a subscription on an R-UIM. The present method facilitates successful authentications and reverse link transmissions from the mobile station on the reverse link channel.

22 Claims, 6 Drawing Sheets

METHOD FOR ESN REBINDING WHEN A TMSI IS ASSIGNED

FIELD OF THE INVENTION

The present invention relates to communications systems and, more particularly, to a method for electronic serial number (ESN) rebinding in a wireless communication device in which a temporary mobile station identifier (TMSI) is assigned.

BACKGROUND OF THE INVENTION

In cellular communication systems, such as a code division multiple access (CDMA) communication system, a subscriber unit or mobile station and a fixed network unit or base station establish a two-way communication link through forward and reverse radio frequency (RF) communication links. The forward communication links originate from the base station and the reverse communication links from the mobile station. The base station normally communicates simultaneously to a number of mobile stations. An example of such a system is described in the Telecommunications Industry Association/Electronic Industry Association Standard 95B (TIA/EIA-95-B).

In many cellular telephone communication systems, the mobile station consists of a Mobile Equipment (ME) and a User Identity Module (UIM), which is inserted into the ME. According to the current standard, each ME has assigned to it an identification number or Electronic Serial Number (ESN). The ESN is used for multiple applications, including authentication and generation of the public long code mask, which is used for reverse link transmissions. In order to perform an authentication and to receive the mobile station's reverse link transmission when it is initially assigned to a traffic channel, the base station or infrastructure must know the ESN of the ME.

In addition, the current standards require that the UIM contain a subscriber's assigned International Mobile Subscriber Identifier (IMSI) and, if assigned, the subscriber's Temporary Mobile Station Identifier (TMSI). The IMSI enables a system to determine the subscriber's home network. In order to protect the privacy of the subscriber, many communications systems make use of a TMSI in lieu of the IMSI. Base stations may assign a temporary TMSI to a subscriber each time the subscriber enters a different call area. The combination of the IMSI and the ME's ESN uniquely identifies the subscriber to any base station. Often, the IMSI and ESN are used by the base stations to bill a subscriber for the time the subscriber uses the system.

Detection of a legitimate subscriber's identification number may be accomplished by RF eavesdropping or by purposeful or inadvertent divulgence of the IMSI/ESN combination by a radiotelephone installer. Once the subscriber's IMSI is known/stolen, a thief may reprogram another mobile station with the stolen IMSI, causing two or more mobile stations to have the same IMSI. While cellular radiotelephone systems have authentication procedures to deny access to subscribers not having legitimate IMSI's, most systems typically lack effective capability for detecting multiple users or to minimize the effect of installer-leaked IMSI's. As a consequence, legitimate users may be billed for both a thief's use of their IMSI as well as their own usage.

Because of the problem with illegitimate subscribers (clones) and other forms of fraudulent access, authentication protocols have been devised. Authentication is the process by which information is exchanged between a mobile station and a base station for the purpose of confirming the identity of the mobile station. Base stations may deny use of the communication system to a mobile station if the requesting mobile station does not meet the authentication requirements of the system. Authentication procedures may require the mobile station to transmit the TMSI, rather than the IMSI, in order to protect the subscriber's identity.

Many mobile stations are now equipped with a Removable-UIM (R-UIM). An R-UIM allows a subscriber to switch cellular phones or upgrade to a more sophisticated cellular phone, without altering the subscriber's existing subscription, by simply removing the R-UIM from one ME and inserting it into another ME. In accordance with current standards, all of the subscriber's subscription information, including the IMSI and TMSI, are stored on the R-UIM.

While R-UIM's allow for greater flexibility in switching among ME's, they present potential problems for authentication. For instance, when an R-UIM, which includes an assigned TMSI, is moved from one ME to another ME, the infrastructure (i.e. the base stations) is not informed of the different ESN which is now associated with the subscriber's subscription information stored on the R-UIM. Because authentication algorithms use the ESN as an input, failure to inform the infrastructure of the different ESN will cause authentication to fail for any message sent from the mobile station to the base station on the access channel. Failure to inform the infrastructure of a new ESN will also cause setup failures because the infrastructure will be unable to receive reverse link transmissions on the reverse traffic channel. Therefore, a need exists for a technique which is effective in binding an existing IMSI/TMSI with a new ESN associated with a different ME.

The present invention contemplates a new and improved method for ESN rebinding which overcomes the above-referenced problems and others.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
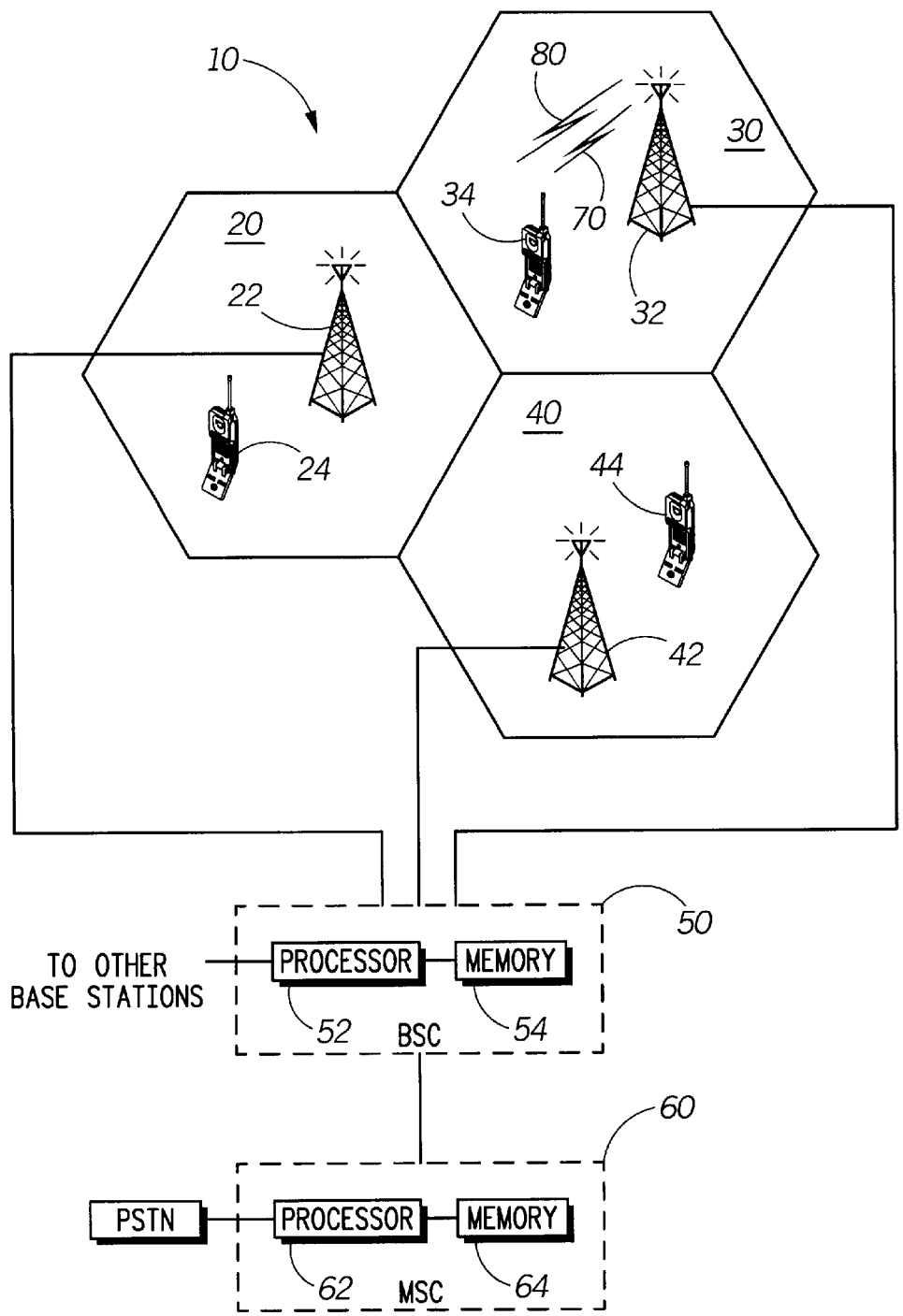
FIG. 1 is a diagrammatic illustration of a wireless communication system according to a preferred embodiment of the present invention.

With reference to FIG. 1, a wireless communication system 10, such as a direct sequence code division multiple access (DS-CDMA) digital radiotelephone system is provided. Base stations 22, 32, 42 may communicate with mobile device 24, operating within coverage area 20, served by base station 22. Similarly, base stations 22, 32, 42 may communicate with a mobile device 34 operating within coverage area 30, served by base station 32. Base stations have fixed locations, such locations chosen to provide overlapping coverage areas. Base stations 22, 32, 42 are coupled to a base station controller (BSC) 50, which includes, among other things, a processor 52 and a memory 54 and which is in turn coupled to a mobile switching center (MSC) 60, also including, among other things, a processor 62 and a memory 64. The BSC and MSC operate according to well-known methods and are commercially available from Motorola, Inc. of Schaumburg, Ill., U.S.A.

Multiple access wireless communication between base stations 22, 32, 42 and mobile devices 24, 34, 44 occurs via radio frequency (RF) channels over which digital communication signals such as voice, data, and video are transmitted. Base-to-mobile device communications are said to occur on a forward-link channel 70, while mobile-to-base communications are referred to as being on a reverse-link channel 80. A communication system using CDMA channelization is described in detail in TIA/EIA Standard TIA/EIA-95-B, which is commonly referred to as IS-95-B.

As shown in FIG. 1, a communication signal 70 is transmitted on an IS-95B forward-link channel, such as a paging channel or traffic channel from a "source" base station, such as base station 32 to mobile device 34. Alternately, a communication signal 80 may be transmitted via an IS-95B reverse-link channel, such as an access channel or a traffic channel by mobile device 34 to its source base station 32. Similarly, other mobile devices may receive and/or transmit communication signals with other base stations.

Figure 2:
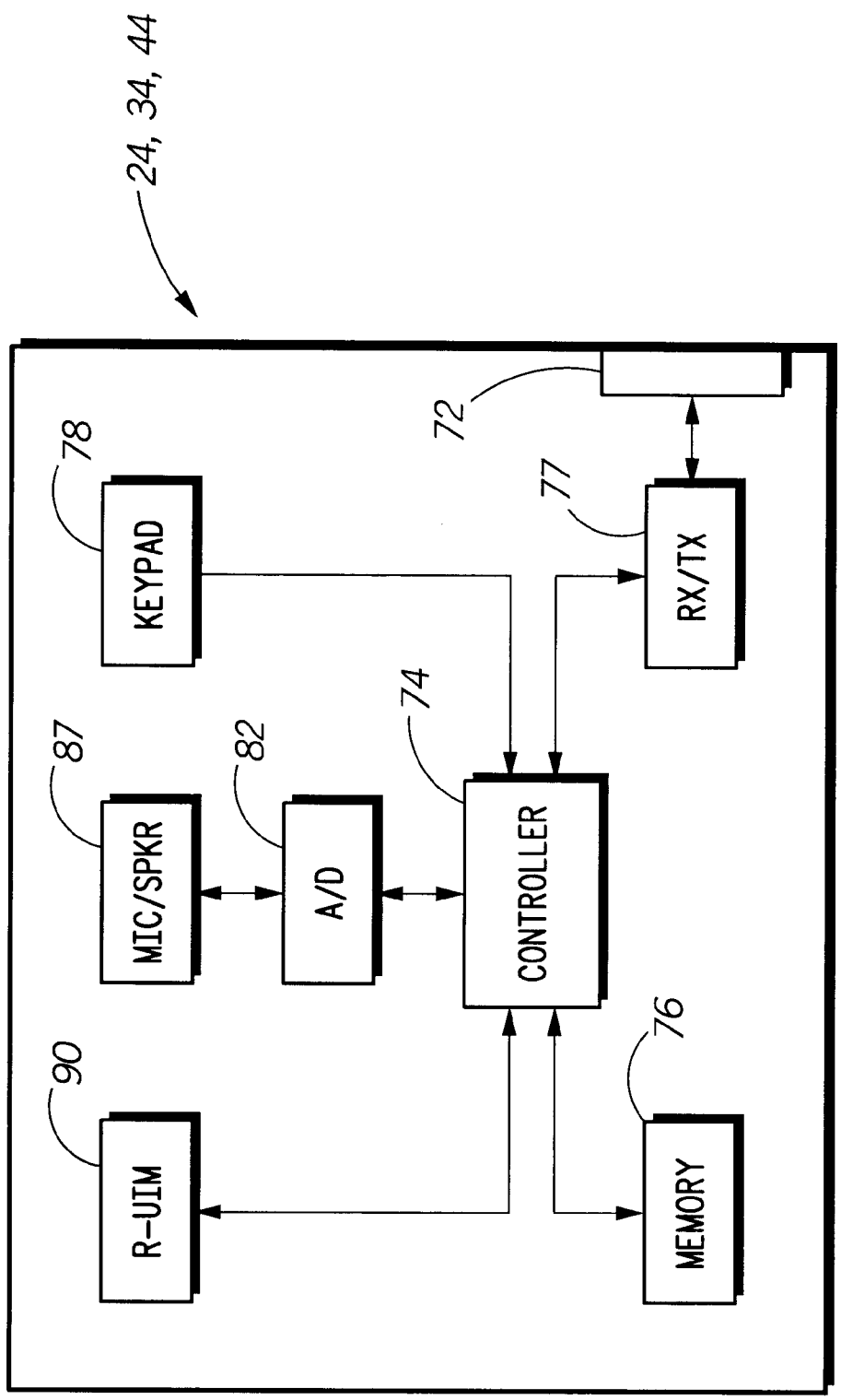
FIG. 2 is a simplified block diagram of an exemplary wireless device that incorporates the features of the present invention therein.

With reference now to FIG. 2, there is shown a simplified block diagram of an exemplary wireless or mobile device 24, 34, 44. The wireless device 24, 34, 44 can be a telephone, a cable telephony interface device, a cellular or PCS radiotelephone, a cordless radiotelephone, a radio, a personal digital assistant (PDA), a pager, a palm-top computer, a personal computer, etc. Accordingly, as used herein, wireless device refers to each of these devices and their equivalents.

The device 24, 34, 44 includes a transceiver 77, transceiver antenna 72, microprocessor-based controller 74, memory 76 (e.g. flash EEPROM), keypad 78, transducers 87 (e.g. microphone, speaker), an analog-to-digital converter 82, and a Removable User Identity Module (R-UIM) 90. The wireless device 24, 34, 44 is adapted to communicate (i.e. transmit and receive communication signals such as data and voice) over a public switched telephone network (PSTN) via a cellular radiotelephone system such as a code-division multiple access (CDMA) cellular radiotelephone system, time-division multiple access (TDMA) cellular radiotelephone system, global system for mobile communication (GSM) cellular radiotelephone system, etc.

Figure 3:
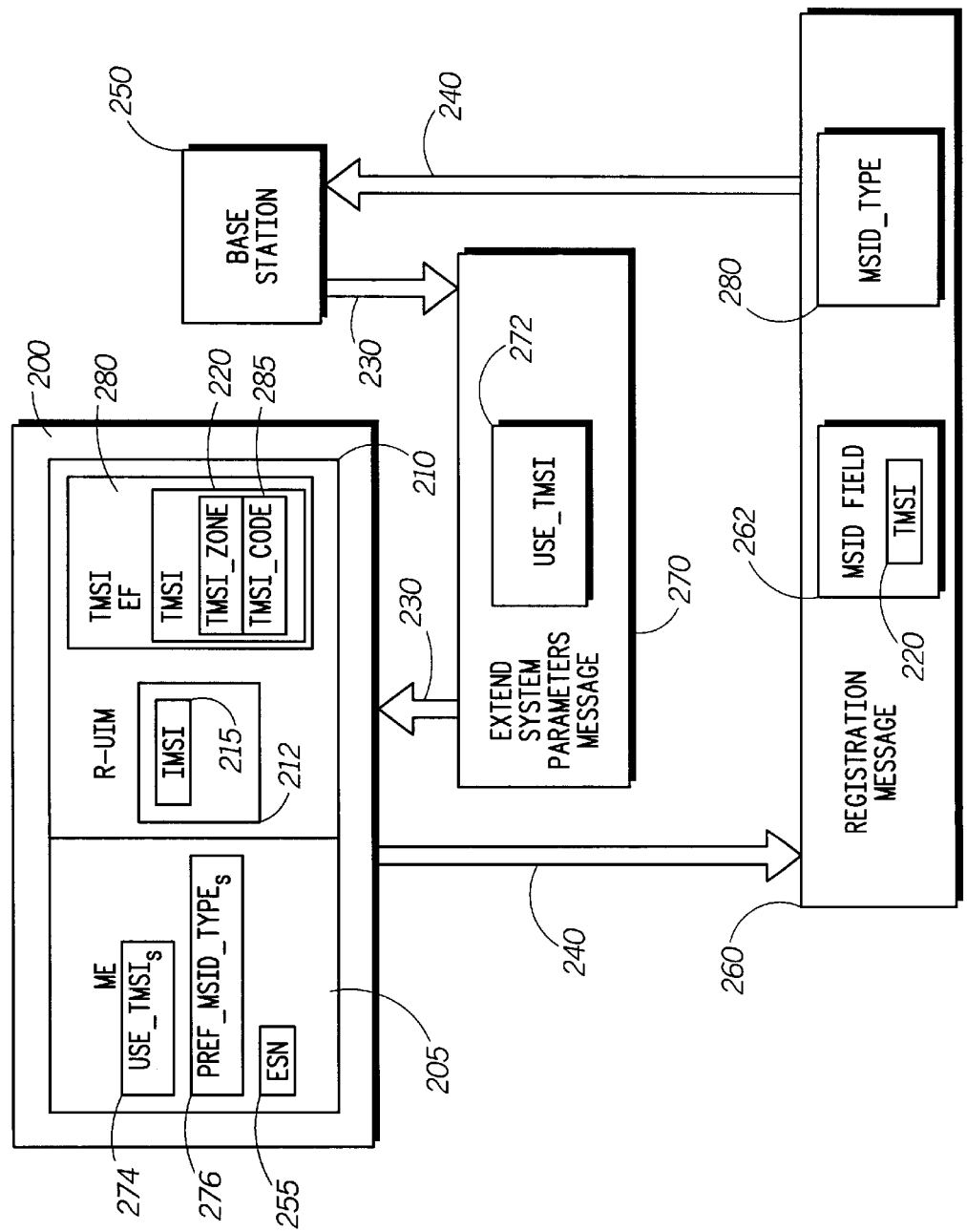
FIG. 3 is a buffer diagram which illustrates the conventional registration process for a wireless device.

With reference now to FIG. 3, there is shown a second simplified block diagram of an exemplary mobile equipment (ME) or wireless device 200. The wireless device 200 can be a telephone, a cable telephony interface device, a cellular or PCS radiotelephone, a cordless radiotelephone, a radio, a personal digital assistant (PDA), a pager, a palm-top computer, a personal computer, etc. Accordingly, as used herein, wireless device refers to each of these devices and their equivalents.

In one embodiment of the present invention, the wireless device 200 includes a Removable User Identity Module (R-UIM) 210. The R-UIM 210 can be moved from one ME to another in a known manner, such as when a subscriber upgrades from one cellular phone model to another. Preferably, the R-UIM 210 stores in a memory 212 thereof, a subscriber's subscription information, including the subscriber's identity number, such as a Mobile Identification Number (MIN) (not shown) or an International Mobile Subscriber Identity or Identifier (IMSI) 215. If one is assigned, the subscriber's Temporary Mobile Station Identity or Identifier (TMSI) 220 is stored within the TMSI Elementary File (EF) 280 and includes a TMSI_CODE 285. The TMSI 220 is an alias often used in place of an IMSI 215, when possible, to protect the identity of the subscriber from eavesdroppers.

As previously mentioned, each subscriber has assigned to him/her an IMSI which uniquely identifies the subscriber to a base station and enables the base station to determine the subscriber's home network. Preferably, a TMSI is assigned to the subscriber and is used in forward-link communications 230, such as in a General Page Message that is transmitted by the base station 250 to the wireless device 200, and reverse-link communications 240, such as in a Registration Message 260 that is transmitted by the wireless device 200 to the base station 250. In addition, each ME 200 has associated with it a factory-set identification number, known as an Electronic Serial Number (ESN) 255 stored in a memory 205 thereof. The ESN is used for multiple purposes, including authentication and generation of the public long code mask.

The wireless device 200 periodically sends registration information to the base stations or infrastructure in the form of a Registration Message 260 transmitted across the reverse-link access channel 240. Registration is the process by which a wireless device identifies its location and parameters to a base station. Preferably, registration occurs automatically each time a wireless device moves from one paging zone or coverage area to another paging zone or coverage area. Registration serves to keep the infrastructure, i.e. the base stations, informed as to the location of the wireless device 200 with respect to a particular coverage area within the wireless communication system 10. Effective wireless device registration aids the infrastructure in targeted paging of the wireless device. In a preferred embodiment, the wireless device 200 performs a registration using the TMSI in order to protect the privacy of the subscriber. According to current standards, the wireless device may be instructed by the infrastructure to use TMSI addressing on the access channel.

The wireless device 200 can only include the TMSI 220 in a mobile station identifier (MSID) field 262 of the Registration Message 260 if a TMSI has been assigned to the particular subscriber. The ME 200 determines whether a TMSI has been assigned by examining the contents of a TMSI Elementary File (EF) 280 stored in the R-UIM 210. If all of the bits in a TMSI_CODE field 285 of the TMSI EF 280 are set to "1", then a TMSI is not assigned. Otherwise, a TMSI is assigned to the subscriber. Preferably, the infrastructure instructs the wireless device 200 to include only the TMSI 220 in the Mobile Station Identifier (MSID) field 262 by setting a USE_TMSI field 272 in the Extended System Parameters Message 270 to "1". In response to this message, the ME 205 sets the USE_TMSI$_s$ 274 value to "1". As shown in FIG. 3, the Registration Message 260 includes the MSID field 262, containing the TMSI 220 and the MSID_TYPE field 280, which is set to "101". Transmitting the Registration Message 260 with the MSID_ TYPE field set to "101" informs the base station 250 that the TMSI is being transmitted by the wireless device 200.

An authentication procedure is performed for access channel messages, including registration messages, transmitted by the wireless device 200 to the infrastructure 22, 32, 42. Authentication consists of an exchange of information between the base station and wireless device in order to confirm the identity of the particular wireless device. Conventional authentication algorithms are described more fully in section 6.3.12 of IS-95B, and are known by those skilled in the art. However, insertion of the R-UIM 210 into a different ME 200, such as an upgraded cellular telephone, will cause an authentication procedure to fail if the infrastructure is not informed of the new ESN.

Figure 4:
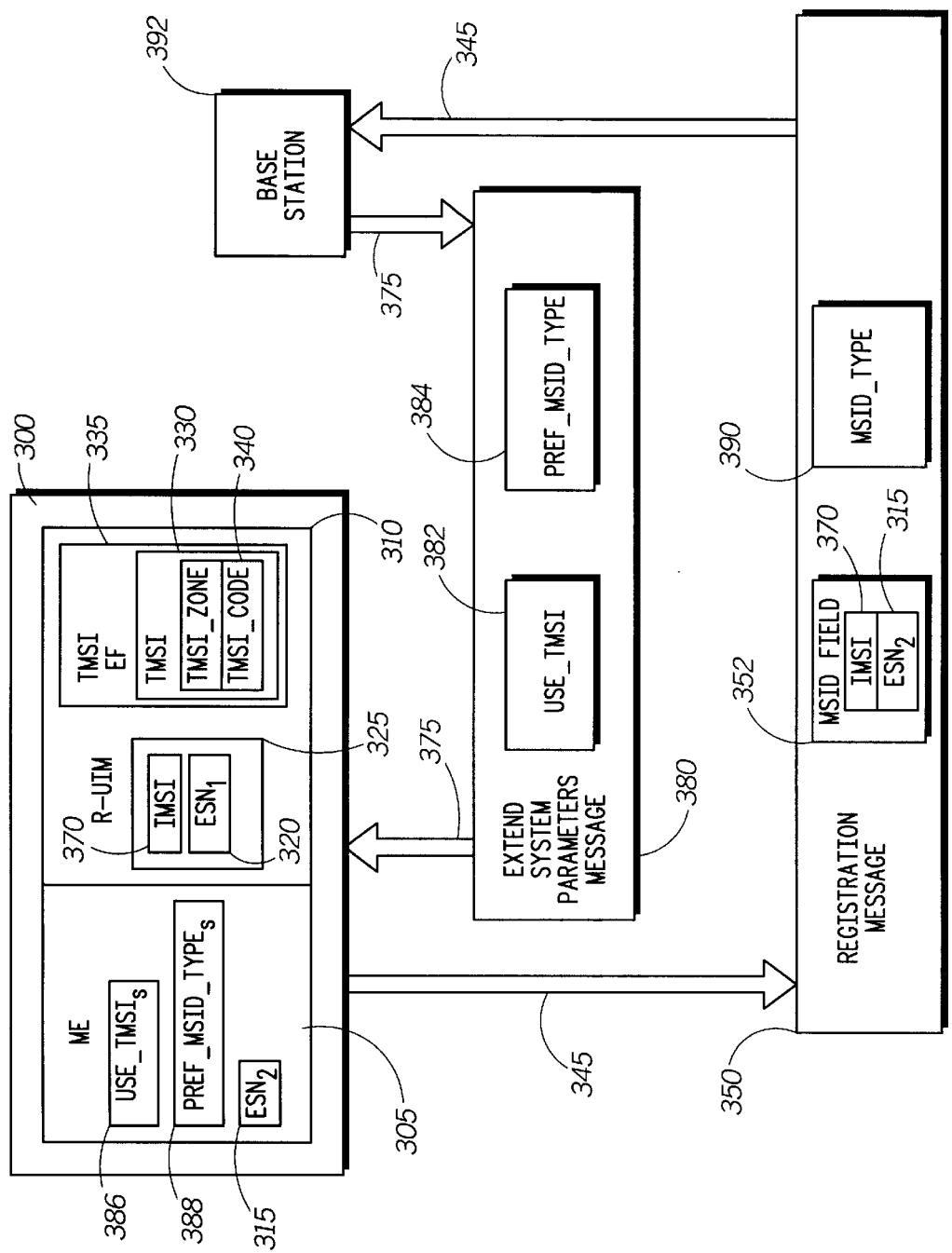
FIG. 4 is a buffer diagram which illustrates the registration process associated with the ESN rebinding method of the present invention.
Figure 5:
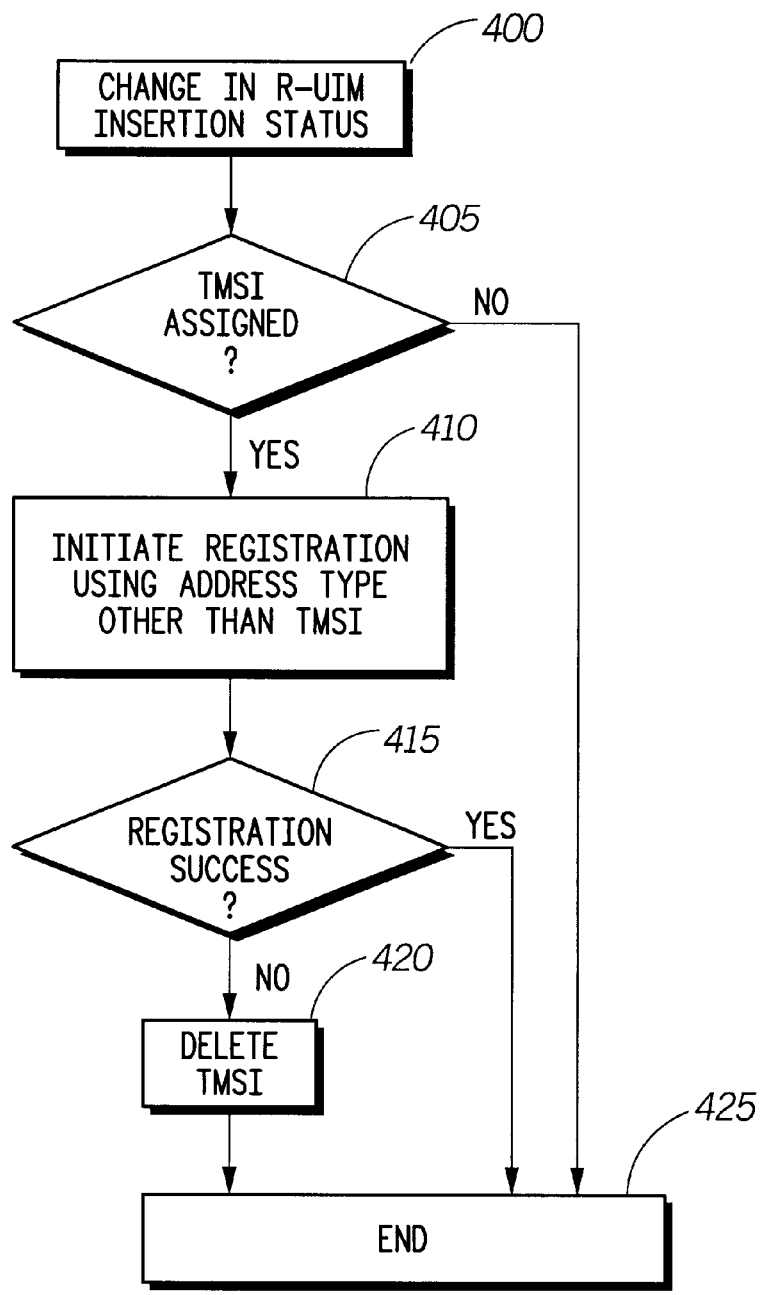
FIG. 5 is a flow chart which illustrates the ESN rebinding method according to a preferred embodiment of the present invention.

With reference now to FIGS. 4 and 5 and continued reference to FIG. 2, a method for binding a new ESN to an assigned TMSI is provided. In one embodiment, a registration procedure is triggered automatically when a change in R-UIM insertion status is detected (step 400). It should be appreciated that the user is unaware of the automatic registration procedure. In other words, the R-UIM 310, in conjunction with the ME controller 74 (FIG. 2), determines that it has been inserted into a new ME 300 which contains an $ESN_2$ 315 that is different from the original $ESN_1$ 320. More particularly, the R-UIM 310 contains in memory 325 the $ESN_1$ 320 for the last ME into which it was inserted. When the R-UIM 310 is inserted into a new ME 300, the $ESN_2$ 315 of the new ME 300 is sent to the R-UIM for comparison with the $ESN_1$ 320 which is stored in the R-UIM memory 325. If the R-UIM determines that the $ESN_1$ and $ESN_2$ do not match, a flag will be sent to the ME controller 74 indicating that a registration may be necessary. At step 405, the ME 300 determines whether a TMSI 330 is assigned to the particular subscriber. The ME 305 accomplishes this by examining the contents of the TMSI Elementary File (EF) 5 335 on the R-UIM 310. If all the bits in the TMSI_CODE field 340 of the TMSI EF 335 are set to "1", then a TMSI is not assigned. Otherwise, a TMSI is assigned. If the ME determines that no TMSI is assigned, the method ends at step 425. Otherwise, the ESN rebinding procedure continues at step 410.

At step 410, the ME 305 initiates a registration using an address type other than the TMSI address type in the mobile station identifier (MSID) field 352 of the Registration Message 350 that is sent across the access channel 345. Preferably, the ME 305 sends the subscriber's IMSI 370 along with the new ME's $ESN_2$ 315 in the mobile station identifier field 352 of the Registration Message 350. However, it should be appreciated that other address types may be transmitted in the MSID field. The infrastructure requires that the IMSI 370 and $ESN_2$ 315 are used in the MSID field 352 for the address type other than the TMSI address type by setting a PREF_MSID_TYPE field 384 in the Extended Systems Parameters Message 380 to "11". In response to the PREF_MSID_TYPE field 384 instruction from the infrastructure, the ME 305 sets the PREF_MSID_ $TYPE_S$ bit 388 to "11". The ME temporarily uses the alternate address type, i.e. the IMSI and ESN, despite the standard instructions to use TMSI addressing for messages transmitted along the access channel 345.

Figure 6:
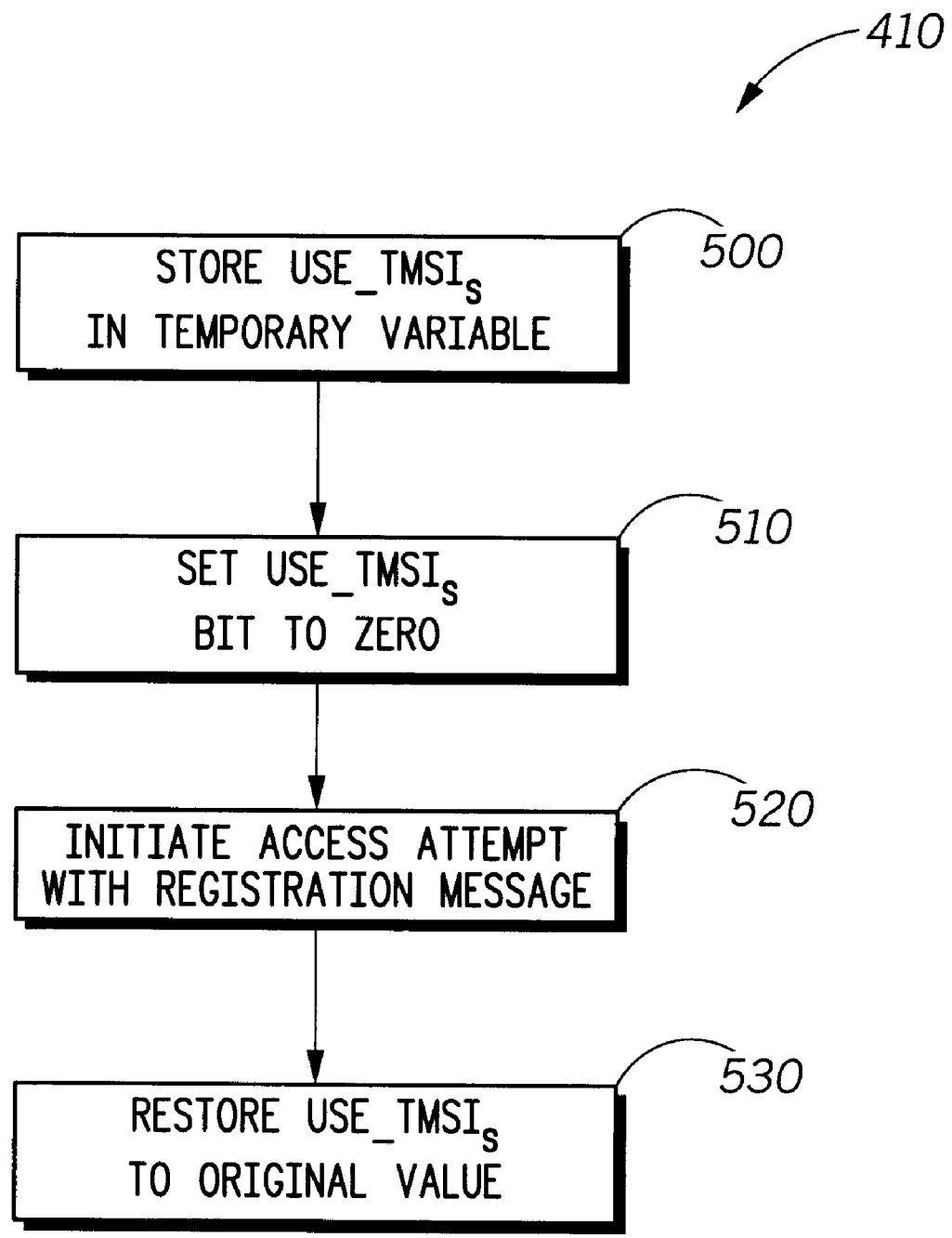
FIG. 6 is a flow chart which illustrates the method of initiating a registration using an address type other than the TMSI address type according to a preferred embodiment of the present invention.

With reference to FIG. 6 and continuing reference to FIGS. 4 and 5, the preferred method for initiating a registration using an address type other than TMSI 410 is provided. The method includes temporarily overriding the stored value in a USE_$TMSI_S$ field 386 of the ME. More particularly, the ME 300 stores the value of USE_$TMSI_S$ 386 in a temporary variable (step 500). Thereafter, the ME then sets the USE_$TMSI_S$ bit to "0" (step 510). An access attempt (registration) is initiated (step 420) using the Registration Message 350. As shown in FIG. 4, the Registration Message 350 includes the MSID field 352, containing the IMSI 370 and the $ESN_2$ 315 and the MSID_TYPE field 390 which is set to "011". Transmitting the Registration Message 350 with the MSID_TYPE field 390 set to "011" informs the base station 392 that alternate identifiers, i.e. identifiers other than the TMSI (such as IMSI and ESN), are being transmitted by the wireless device 300. The temporary override concludes with restoring the USE_$TMSI_S$ bit to the value which was stored in the temporary variable (step 530). When the infrastructure receives the Registration Message 350 containing the IMSI 370 and $ESN_2$ 315, it updates the ESN for the subscription associated with the IMSI to the newly received value. Consequently, when the ME sends an access channel message with only the TMSI address type in future reverse-link communications, the infrastructure will have the up-to-date ESN and can successfully perform authentication and receive communications along the reverse traffic channel.

Referring again to FIG. 5, after a registration is initiated using an address type other than a TMSI (step 410), the ME determines if the registration was successful (step 415). Registration success is verified when the ME 300 receives an acknowledgment from the base station 392 of the access attempt for the Registration Message 350. When the ME determines that the registration was successful, the new $ESN_2$ is bound to the pre-existing TMSI using conventional methods. At this point, the method ends at step 425. Conversely, registration failure may occur due to a call origination by the user, receipt of a page, or an access failure.

In the case of registration failure, the ME deletes the TMSI from the memory of the R-UIM (step 420). In one embodiment, the ME 300 deletes the TMSI 330 from the R-UIM 310 by setting all bits in the TMSI_CODE field 340 of the TMSI EF 335 to "1". After deletion of the TMSI from the R-UIM, the method ends at step 425. Deleting the TMSI for the case of registration failure allows the infrastructure to receive the IMSI and ESN in a subsequent message. According to IS-95B, the ME cannot use the TMSI address format on the access channel once the TMSI has been deleted. This feature guarantees that the infrastructure will be able to perform authentication successfully and acquire the reverse traffic channel. In the error case, the infrastructure will assign a new TMSI after receiving the subsequent access channel message using an address type other than the TMSI address type. It should be appreciated that the present invention only requires reassigning a new TMSI in the error case where the registration using the IMSI and ESN fails.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. In a wireless communication device having an electronic serial number (ESN) associated therewith, said communication device adapted to receive a removable user identity module (R-UIM) having memory for storing a temporary mobile station identifier (TMSI), a method of associating the ESN with the TMSI comprising:

mating the R-UIM with the communication device;

receiving an instruction to use TMSI addressing; and registering the wireless device with a communication system infrastructure by transmitting an identifier other than the TMSI.

2. The method according to claim 1 further comprising:
determining whether the registration was successful;
if the registration was not successful, deleting the assigned TMSI from the R-UIM memory; and
if the registration was successful, maintaining the assigned TMSI in the R-UIM memory.

3. The method according to claim 2, wherein the determining step includes:
receiving an acknowledgment from the base station of an access attempt for the registration message.

4. The method according to claim 3, wherein in the case of an unsuccessful registration attempt, the method includes:
deleting the assigned TMSI from the R-UIM memory.

5. The method according to claim 4, wherein deleting the assigned TMSI includes:
setting all bits in a TMSI_CODE field of a TMSI elementary file (EF) to one.

6. The method according to claim 1, wherein the registering step includes the step of:
transmitting a registration message to a base station across an access channel.

7. The method according to claim 6, wherein the transmitting step includes:
transmitting an international mobile subscriber identifier (IMSI) associated with the R-UIM and the ESN across the access channel.

8. The method according to claim 7, further including:
the step of transmitting the IMSI and the ESN in a mobile station identifier field of the registration message.

9. The method according to claim 1, further including:
the step of temporarily overriding instructions from the infrastructure to transmit the TMSI across an access channel.

10. The method according to claim 9, wherein temporarily overriding infrastructure instructions includes:
storing a value USE_TMSIS in a temporary variable;
setting the USE_TMSIS bit to zero;
initiating the access attempt with the Registration message; and
restoring USE_TMSIS to the value which was stored in the temporary variable.

11. A mobile wireless communication device comprising:
a first memory for storing an electronic serial number (ESN);
a user identity module (R-UIM) adapted to removably mate with the communication device, said R-UIM including a second memory that stores a temporary mobile station identifier (TMSI);
means for determining a change in an insertion status of the R-UIM;
means for receiving a request to use the TMSI for registrations;
means for initiating a registration procedure with a base station using an identifier that is different than the TMSI;
means for determining whether the registration procedure was successful; and
means for deleting the TMSI from the second memory if the registration procedure was not successful.

12. The mobile wireless communication device according to claim 11, wherein:
the registration procedure is initiated by transmitting a Registration Message containing an international mobile subscriber identifier (IMSI) associated with the R-UIM and the ESN.

13. The mobile wireless communication device according to claim 11, said mobile wireless communication device further including:
means for storing a USE_TMSIS in a temporary variable field;
means for setting the USE_TMSIS value to a zero value; and
means for restoring the USE_TMSIS value to the value which was stored in the temporary variable.

14. A method of registering a wireless device when a Removable User Identity Module (R-UIM) containing an assigned TMSI is placed in a foreign mobile equipment unit (ME), said method comprising:
(a) receiving an instruction to use TMSI addressing;
(b) determining a change in insertion status of the R-UIM;
(c) transmitting a Registration Message containing an address type which is different than the TMSI address type stored in R-UIM memory;
(d) determining whether the attempted registration was successful; and
(e) one of (i) deleting the assigned TMSI from the R-UIM memory, and (ii) maintaining the assigned TMSI in the R-UIM memory in response to step (d).

15. The method according to claim 14,
wherein the transmitted Registration Message includes an international mobile station identity (IMSI) associated with the R-UIM and an electronic serial number (ESN) associated with the ME.

16. The method according to claim 14, wherein step (c) includes: storing a value contained in a USE_TMSIS bit field in a temporary variable;
setting the USE_TMSIS bit to zero;
initiating transmission of the Registration Message to a base station; and
restoring USE_TMSIS to the value stored in the temporary variable.

17. The method according to claim 14, wherein step (d) includes:
receiving an acknowledgment from a base station of transmission of the Registration Message.

18. A portable wireless communication device comprising:
a memory for storing a first electronic serial number (ESN) uniquely associated with said device; and
an R-UIM removably carried on said device, said R-UIM including;
a second ESN, said second ESN associated with a second device and not associated with said first ESN, said second ESN stored in a memory of said R-UIM; and
a temporary mobile subscriber identifier (TMSI) stored in the memory of said R-UIM.

19. A method in a wireless communication device comprising the steps of:
receiving a TMSI to be transmitted by the device in place of an TMSI to protect the subscriber identity;
determining that a first ESN does not match a second ESN; and
transmitting said second ESN and said IMSI in place of said TMSI in response to said determination.

20. The method of claim 19, further comprising the step of, detecting insertion of a R-UIM in said wireless communication device, wherein said R-UIM includes said TMSI and said first ESN.

21. In a wireless communication device having an electronic serial number (ESN) associated therewith, said communication device adapted to receive a removable user identity module (R-UIM) having memory for storing a temporary mobile station identifier (TMSI), a method of associating the ESN with the TMSI comprising:

mating the R-UIM with the communication device;

registering the wireless device with a communication system infrastructure by transmitting an identifier other than said TMSI;

determining whether the registration was successful;

if the registration was not successful, deleting the assigned TMSI from the R-UIM memory; and if the registration was successful, maintaining the assigned TMSI in the R-UIM memory.

22. A method of registering a wireless device when a Removable User Identity Module (R-UIM) containing an assigned TMSI is placed in a foreign mobile equipment unit (ME), said method comprising:

(a) determining a change in insertion status of the R-UIM;

(b) transmitting a Registration Message containing an address type which is different than the TMSI address type stored in R-UIM memory comprising:

storing a value contained in a USE_TMSIS bit field in a temporary variable;

setting the USE_TMSIS bit to zero;

initiating transmission of the Registration Message to a base station; and restoring USE_TMSIS to the value stored in the temporary variable;

(c) determining whether the attempted registration was successful; and (d) one of (i) deleting the assigned TMSI from the R-UIM memory, and (ii) maintaining the assigned TMSI in the R-UIM memory in response to step (c).

\* \* \* \* \*